May 4, 1965 N. H. SCHERMER 3,181,688
ROLLER CONVEYOR WITH SPROCKETS ON BEARINGS
Filed Dec. 3, 1963

INVENTOR.
Nathan H. Schermer
BY
Harness, Dickey & Pierce
ATTORNEYS

United States Patent Office 3,181,688
Patented May 4, 1965

3,181,688
ROLLER CONVEYOR WITH SPROCKETS ON BEARINGS
Nathan H. Schermer, Detroit, Mich., assignor to Acme Ball Bearing & Manufacturing Company, Detroit, Mich., a corporation of Michigan
Filed Dec. 3, 1963, Ser. No. 327,676
5 Claims. (Cl. 198—127)

This invention relates to roller conveyors, and more particularly to conveyors of the type having a series of power-driven rollers along which parts are transported.

It is an object of the invention to provide a novel and improved power-driven roller conveyor in which maximum utilization is made of the overall width of the conveyor assembly, thus increasing the handling capacity of the conveyor.

It is another object to provide an improved roller conveyor of this type which will operate with improved efficiency and will enable the use of a greater conveyor length for a given input power.

It is a further object to provide an improved roller conveyor of this character which increases the flexibility of construction, enabling rollers to be placed very closely together if desired for given conditions.

It is also an object to provide an improved roller conveyor having these characteristics which lends itself to high quantity production, permits the stocking and standardization of parts so as to quickly assembly conveyors of different widths, lengths and roller spacing, and in which repair and maintenance are facilitated.

Other objects, features, and advantages of the present invention will become apparent from the subsequent description, taken in conjunction with the accompanying drawings.

Briefly, the illustrated embodiment of the invention comprises a frame having legs and a pair of parallel horizontal members between which a series of parallel rollers are rotatably mounted. The means for mounting each roller comprises a pair of antifriction bearings at the ends thereof, the inner races of which carry pins extending outwardly therefrom. Each roller comprises a cylindrical member and the outer race of each bearing is secured within the corresponding end of the roller by a press fit. Part of each outer race extends from the roller, and sprocket teeth are carried by this exposed portion, the sprocket teeth thus being spaced a slight distance inwardly from the frames. Endless chains connect alternately opposite ends of adjacent rollers, the chains being mounted on the sprocket teeth. An electric motor or other rotary driving means may be connected to one or more of the sprocket teeth.

Referring more particularly to the drawings, the conveyor is generally indicated at 11 and comprises a frame generally indicated at 12 having four upstanding legs 13 which support a pair of parallel horizontal members 14. These members are of channel-shaped cross section, their web portions facing each other. Diagonal braces 15 may be provided between legs 13 and members 14.

Figure 3:
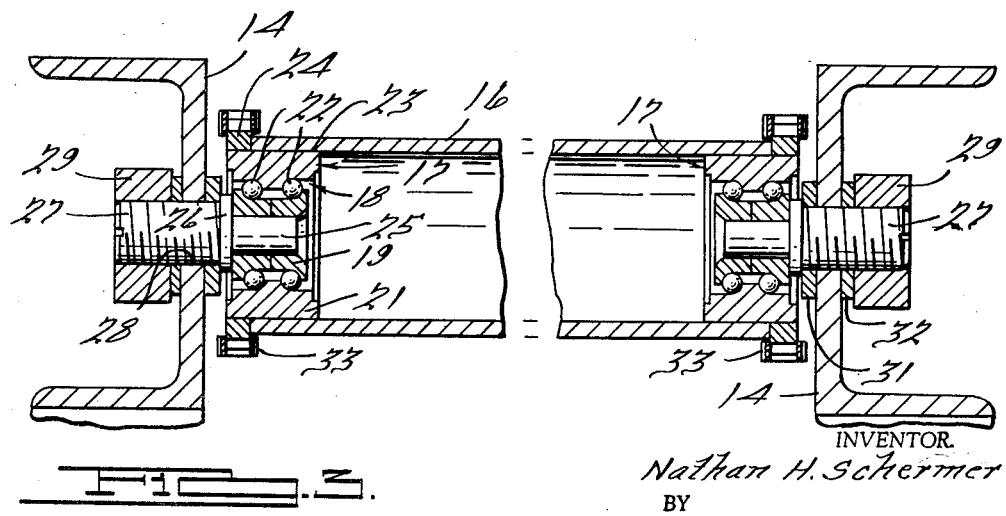
FIGURE 3 is a fragmentary cross-sectional view in elevation taken along the line 3—3 of FIGURE 2, and showing the manner in which the bearing and sprocket subassemblies are secured to the rollers and frame.

A plurality of rollers 16 are provided, these rollers being of cylindrical shape and arranged in spaced parallel relation between frame members 14. The means for mounting rollers 16 to frame members 14 comprises mounting subassemblies each of which is generally indicated at 17 in FIGURE 3.

Each mounting subassembly 17 comprises an antifriction bearing generally indicated at 18, the bearing having an inner race 19, an outer race 21, and balls 22 between the races, two rows of balls being shown. The outer race 21 of bearing 18 has a smooth outer surface 23 and a member 24 having outwardly extending sprocket teeth is secured to an end portion of surface 23. The securing of member 24 to surface 23 may be by means of brazing, welding or the provision of a flat or other non-circular surface, the connection between member 24 and surface 23 being such that member 24 is rigidly connected to outer race 21 at the outer end of the race. The diameter of sprocket member 24 may be varied, this member being shown as having a slightly larger diameter than roller 16. It should also be noted that instead of providing a separate member 24, the sprocket teeth may be directly formed on the outer portion of race 21.

A pin 25 is secured within the inner race 19 of each bearing 18 and extends outwardly therefrom, the pin having a shoulder 26 engageable with the outside of inner race 19. A threaded portion 27 of each pin 25 extends through an apertured portion 28 in the web of the corresponding frame member 14, and a nut 29 is threadably mounted on portion 27. Washers 31 and 32 are placed on opposite sides of the web of member 14 so that when nut 29 is tightened, shoulder 26 will be drawn tightly against washer 31 and nut 29 against washer 32, securing the pin to member 14.

Figure 1:
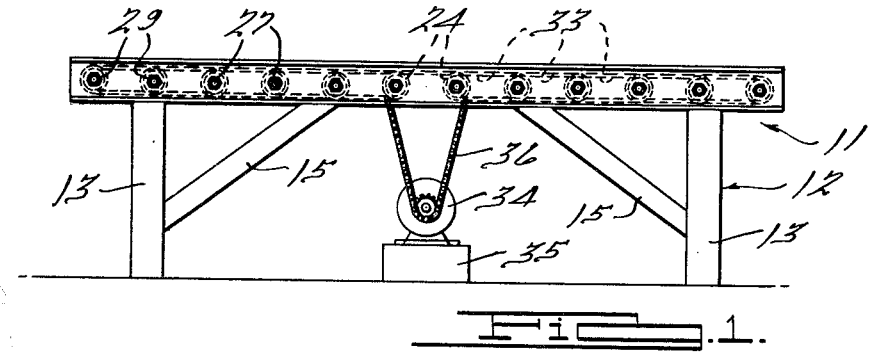
FIGURE 1 is a side elevational view of a roller conveyor embodying the principles of this invention.
Figure 2:
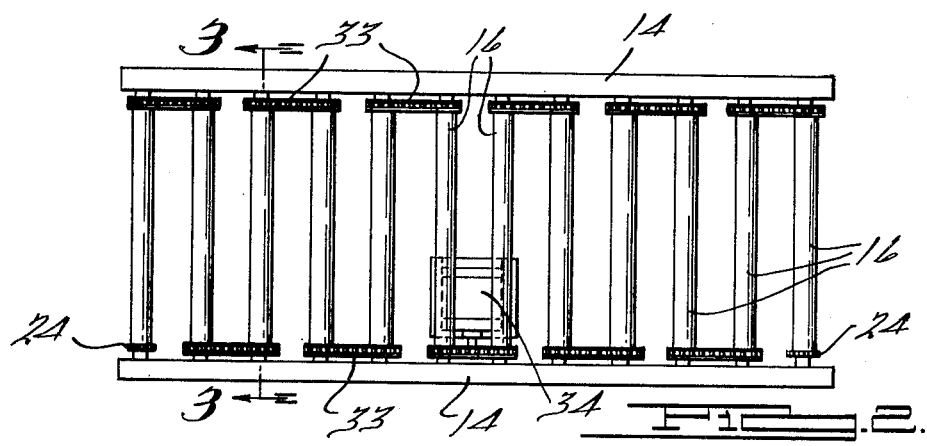
FIGURE 2 is a top plan view thereof.

Members 14 are provided with a series of apertures 28 spaced apart a distance depending upon the desired distance between rollers 16. A plurality of endless chains 33 connect alternately opposite adjacent sprocket members 14, as seen in FIGURE 2. Chains 33 therefore permit the driving of all rollers 16 when one or more of them is driven. A prime mover 34 such as an electric motor mounted on a base 35 below frame members 14 drives a chain 36 which is connected to two sprockets 24 of adjacent rollers 16, as seen in FIGURE 1. Driving of these rollers 16 will thus drive all rollers 16 due to the interconnecting chains 33.

In assembling the unit, subassemblies 17 will first be fabricated, these subassemblies comprising pins 25, bearings 18 and sprockets 24. The subassemblies will then be press fitted into rollers 16 of the desired length, and projecting pin portions 27 at the opposite ends of the rollers will be inserted within frame members 14 and secured thereto by washers 31 and 32 and nuts 29. Endless chains 33 and 36 can be mounted in position on the sprockets.

In operation, energization of motor 34 will cause rotation of all rollers 16 in the same direction, so that objects placed on one end of the conveyor will be transported to the other end.

It should be observed that because of the novel construction, in which sprockets are alongside rather than mounted on rollers 16, the full lengths of the rollers will be available for transporting purposes. Since sprockets 24 may be made of relatively small diameter, rollers 16 may be placed close together if desired, apertures 28 in frame members 14 being correspondingly located. The fact that sprockets 24 may be made with a relatively small diameter will also result in a saving in material and machining costs. In fact, the novel subassembly of the bearing and sprocket will greatly reduce assembly costs, as well as providing salvage value in cases where rollers 16 themselves are damaged and must be scrapped. The fact that the sprocket teeth are carried by the outer race will mean that they are concentric therewith, thus lessening friction and increasing operational efficiency. This in turn will mean that more rollers can be driven with a given horsepower motor, or alternatively, that lighter chains and sprockets may be used for a conveyor of a given capacity. The subassembly arrangement will also mean that a manufacturer or user can stock standard parts and thus assemble conveyors of different sizes to meet particular requirements. For example, rollers 16 of different lengths could be stocked and subassemblies 17 mounted in rollers of any length when it is desired to assemble a conveyor. If it is required to change the width of a conveyor, subassemblies 17 could be reused, rollers 16 being replaced.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a power driven roller conveyor, a frame having a pair of spaced parallel frame members, a series of cylindrical rollers in spaced parallel relation between said frame members, a pair of mounting subassemblies secured to the ends of each roller, each subassembly comprising a bearing having inner and outer races, a pin secured to the inner race and extending outwardly therefrom, means securing the outer end of said pin to the adjacent frame member, a smooth outer surface on the outer race, said outer surface being secured within the adjacent end of the rollers, a portion of the outer race extending outwardly from said end, and sprocket teeth carried by said outwardly extending portion of the outer race.

2. In a power driven roller conveyor, a frame having a pair of spaced parallel frame members, a series of cylindrical rollers in spaced parallel relation between said frame members, a pair of mounting subassemblies secured to the ends of each roller, each subassembly comprising a bearing having inner and outer races, a pin secured to the inner race and extending outwardly therefrom, means securing the outer end of said pin to the adjacent frame member, a smooth outer surface on the outer race, said outer surface being secured within the adjacent end of the rollers, a portion of the outer race extending outwardly from said end, sprocket teeth carried by said outwardly extending portion of the outer race, and endless chains mounted on said sprockets and connecting alternately opposite ends of adjacent rollers.

3. In a power driven roller conveyor, a frame having a pair of spaced parallel frame members, a series of cylindrical rollers in spaced parallel relation between said frame members, a pair of mounting subassemblies secured to the ends of each roller, each subassembly comprising a bearing having inner and outer races, a pin secured to the inner race and extending outwardly therefrom, means securing the outer end of said pin to the adjacent frame member, a smooth outer surface on the outer race, said outer surface being secured within the adjacent end of the rollers, a portion of the outer race extending outwardly from said end, a sprocket member secured to said outwardly extending portion of the outer race, and endless chains mounted on said sprockets and connecting alternately opposite ends of adjacent rollers.

4. In a power driven roller conveyor, a frame having a pair of spaced parallel frame members, a series of cylindrical rollers in spaced parallel relation between said frame members, a pair of mounting subassemblies secured to the ends of each roller, each subassembly comprising a bearing having inner and outer races, a pin secured to the inner race and extending outwardly therefrom, apertured portions in said frame members, said pin extending through one of said apertured portions and being secured thereto, a smooth outer surface on the outer race, said outer surface being secured within the adjacent end of the rollers, a portion of the outer race extending outwardly from said end, a sprocket member secured to said outwardly extending portion of the outer race, and endless chains mounted on said sprockets and connecting alternately opposite ends of adjacent rollers.

5. In a power driven roller conveyor, a frame having a pair of spaced parallel frame members, a series of cylindrical rollers in spaced parallel relation between said frame members, a pair of mounting subassemblies secured to the ends of each roller, each subassembly comprising a bearing having inner and outer races, a pin secured to the inner race and extending outwardly therefrom, apertured portions in said frame members, said pin extending through one of said apertured portions and being secured thereto, a shoulder on said pin between said inner race and the adjacent frame member, a smooth outer surface on the outer race, said outer surface being secured within the adjacent end of the rollers, a portion of the outer race extending outwardly from said end, a sprocket member secured to said outwardly extending portion of the outer race, and endless chains mounted on said sprockets and connecting alternately opposite ends of adjacent rollers.

References Cited by the Examiner

UNITED STATES PATENTS

| 25,973 | 11/59 | Magee | 198—127 X |
|---|---|---|---|
| 1,702,579 | 2/29 | Taylor | 198—127 X |
| 2,609,917 | 9/52 | Gotthardt | 198—127 |
| 2,836,284 | 5/58 | Gilliatt | 198—127 |
| 2,973,093 | 2/61 | Erickson | 198—127 X |

SAMUEL F. COLEMAN, *Primary Examiner.*